Patented June 8, 1926.

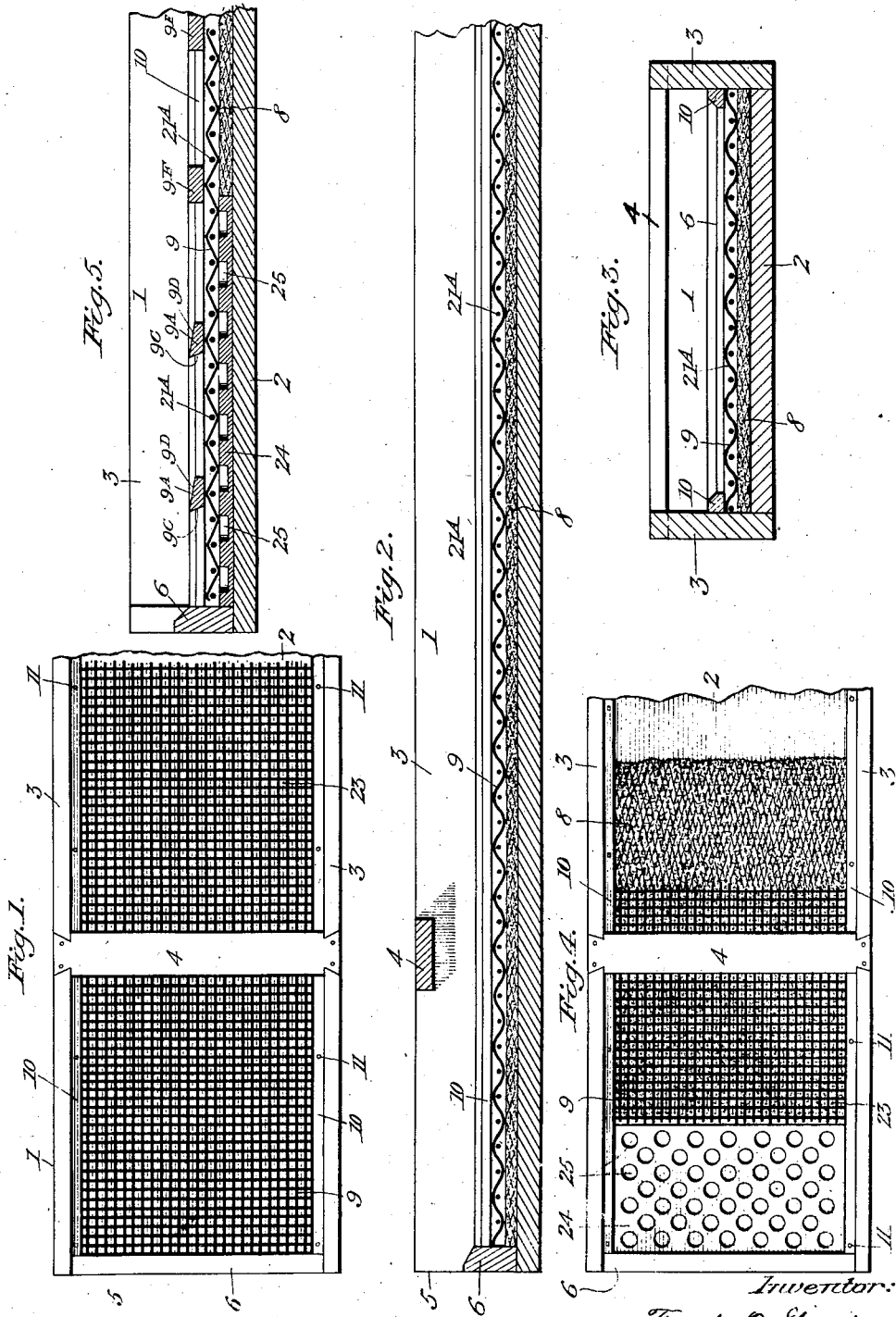

1,588,102

UNITED STATES PATENT OFFICE.

FOREST D. GOODY, OF DENVER, COLORADO.

CONCENTRATING DEVICE.

Application filed January 19, 1925. Serial No. 3,400.

My invention relates to a new automatically operating gold saving and concentrating device for the recovery of placer gold, silver, platinum and other valuable metals.

And the objects of my invention are:

First: To provide a gold saving device for the recovery of gold, silver, platinum and other valuable metals from either water flowing placer sand and gravel, or from water flowing mill tailings, or from ore pulps or slimes, or for treating these valuable metal containing gravels, sands, or mill products without the use of water, that is, sluicing and concentrating them in a dry state in my gold saving and concentrating device.

Second: To provide a gold and other metal saving device, for the recovery of the gold, silver, platinum, and the black and grey sands from placer ground, and that is arranged to receive the finer particles of the gravel and of the sand after the coarse rocks and gravel have been sloughed off and discharged away from the saving device, by a grizzly or a screening apparatus, and that will concentrate and save out of the finer placer gravel and sands of the placer ground, the gold, silver, platinum and other valuable metals so that they can be recovered in their pure individual native state, and in a condition that will enable them to be recovered and individually separated from each other.

Third: To provide a simple, inexpensive and practically operating placer mining device by which either the wet, or water flowing system, or the dry ground system can be used to recover the gold and other metals therefrom by simply a natural and regulated and an adjustable flow of the placer ground through it.

I attain these objects by the mechanism illustrated in the accompanying drawings, in which:

Figure 1 is a plan of a portion of one of the improved sluice boxes.

Figure 2 is a vertical, longitudinal, sectional view thereof on a slightly larger scale.

Figure 3 is a vertical transverse sectional view of the same.

Figure 4 is a plan view of a sluice box similar to that shown in previous views, but provided with an amalgamating plate at its receiving end; the wire screen being broken away to give an unobstructed view of said plate.

Figure 5 is a vertical longitudinal sectional view of the Figure 4.

Similar letters of reference refer to similar parts throughout the several views.

My invention relies principally on the action of the screen member of the combination of gold saving elements that comprise my gold saving device; which while looking rigid, is not held rigidly and has the effect of and gives the same result as though it were vibrating. The screen receives a trembling action on account of the forcible contact of the coarse placer rocks and gravel that flow through its long launder or sluice box and strike continuously against its cross wires, which provide a cross riffling effect and automatically cause a panning or vibrating action to be imparted to it, which retards and slows down the gold and silver carrying drag material which seats the gold and other valuable contents, and provides the means that sloughs off non-value carrying light and heavy sands as the small rocks and the coarse gravel rattle continuously against the cross wires throughout the whole length of the screen as the placer pulp flows through it.

Referring to the drawings:

The numeral 1 designates a rectangular-shaped long narrow box which forms the outside casing portion of my gold and other metal saving and concentrating device.

This casing consists of a bottom part 2, and opposite side parts 3; the top part of the box is preferably left open, but it can be closed if desired by a cover, either throughout a part or the whole of its length.

The sides 3 are secured together at their top edges by cross strips 4, that are preferably dove-tailed into and nailed to the top edges of the sides 3 at two or more places in the length of the sluice box, and the upper end 5 is closed for a part of the height of the sluice box from its bottom up, by a cross-piece 6, but the lower end 7 is left open. I can make these long boxes of either metal or wood or any other suitable material. I preferably, however, make them of wooden boards or planks, and simply nail the sides to the bottom.

My combined gold saving and concentrating devices are used in overlapping end to end alignment, or, if preferred, the second one can overlap the discharge end of the first gold saving box and be placed to extend at a sidewise angle away from the direction the first one is positioned in, in order that the second one will carry the tailings to one side of the first one, and it may be placed in any angular position and in any direction from it, which it is desired to discharge the tailings in.

Upon the bottom of each sluice box I lay a piece of relatively thick coarse fabric having large interstices, such as a matting of coarsely twisted rope strand burlap, or the like, shown by numeral 8 on the drawing.

I preferably lay this gold and other metal catching material down against and across the entire width and throughout the entire length of each sluice box, preferably without fastening it to the bottom of the sluice box, although, if desired, it may be secured to the bottom of the sluice box in any easily freed and removable manner.

On top of this gold and other metal catching material, I lay a screen 9, which may be made of any suitable sheet metal, but it can be made of rubber or of any other hard material. I preferably, however, make it of wire, and as illustrated, it is about a three-eighths inch wire screen, and I preferably use from a one-eighth to about a three-quarter inch mesh wire screen in all of my gold saving boxes, although a wire screen of finer or coarser mesh may be used if desired. I have designated the cross wires of this screen 21$^A$. This screen 9, fits loosely in between the opposite sides of the gold saving box, and extends throughout its length, and either one or two or three lengths of the wire screen may be placed end to end on the gold and other metal catching matting material if desired, instead of a single length of it.

The screen or screens may be secured in place on top of the matting by any suitable means. I preferably, however, employ two strips of wood 10, one along each side of the box 1, which I preferably make long enough to extend the whole length of the sluice box, and I make them wide enough to overlap the opposite side edges of the screen or screens 9, and I removably secure them to the inside surfaces of the sides of the sluice box, preferably by nails 11, which I drive through them into the sides of the sluice box. An amalgamating plate 24, provided with mercury containing cups 25, is sometimes substituted for a section of the matting at the raised end of the box.

In some instances, especially where the gold is very fine, known as flour gold, I find it preferable to add riffles 9$^A$ placed at intervals along the top of screen 9. The edges 9$^C$ against which the flowing gravel strikes are beveled inwardly, and the rear tops are beveled downwardly as shown in 9$^D$.

The operation of my device is as follows: A supply of gold, silver or other valuable metal bearing placer gravel and sand, and a supply of running water are discharged into the box, the larger rocks having previously been eliminated from the gravel. This mixture enters the upper end 5 of the box, which is adjusted at the angle desired by any suitable means. The mixture of water and gravel then flows by gravity in a stream that is thin enough to allow the particles to engage and contact with the cross-wires 21$^A$ of the mesh, which act as cross-riffles, to stop or retard the flow long enough for the precious metal to settle down through the open mesh to the matting. The metal is thus retained beneath the wire mesh and settles in the wide interstices of the matting where it is retained for later removal.

It will be understood that the concentrating device may operate either at a set angle or may be vibrated by any suitable mechanism.

My invention is adapted to all kinds and characters of placer mining work, and for the recovery of gold that is now lost in the tailings of ore treating mills of all kinds, and while I have illustrated and described the preferred construction and arrangement of my automatically operating gold saving and concentrating device, I do not wish to be limited to the construction and arrangement shown, as changes may be made in it without departing from the spirit of my invention.

Having described my invention what I claim as new and desire to secure by Letters Patent is:

1. A concentrating device, comprising as an essential part the combination of a box having a smooth bottom, a matting of coarsely twisted rope strand burlap, in firm contact with the said bottom and means on the matting for checking the underflow of the water, sand and gravel carrying the values.

2. A concentrating device, comprising as an essential part the combination of a box having a flat bottom, a matting of a relatively thick and coarse fabric defining relatively large interstices, in firm contact with the bottom and means on the matting for checking the underflow of the water, sand and gravel carrying the values.

In testimony whereof I affix my signature.

FOREST D. GOODY.